US010750407B2

(12) United States Patent
Yan et al.

(10) Patent No.: US 10,750,407 B2
(45) Date of Patent: Aug. 18, 2020

(54) METHOD AND SYSTEM FOR DATA FLOW ENFORCEMENT

(71) Applicant: Verizon Patent and Licensing Inc., Arlington, VA (US)

(72) Inventors: Lixia Yan, Basking Ridge, NJ (US); Imtiaz Shaikh, Irving, TX (US); Barry F. Hoffner, Bridgewater, NJ (US); Ho Yin Cheuk, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 32 days.

(21) Appl. No.: 15/683,020

(22) Filed: Aug. 22, 2017

(65) Prior Publication Data

US 2019/0069199 A1  Feb. 28, 2019

(51) Int. Cl.
| | |
|---|---|
| *H04L 12/26* | (2006.01) |
| *H04W 28/12* | (2009.01) |
| *H04W 28/02* | (2009.01) |
| *H04L 29/08* | (2006.01) |
| *H04W 88/08* | (2009.01) |

(52) U.S. Cl.
CPC ....... *H04W 28/12* (2013.01); *H04W 28/0268* (2013.01); *H04L 67/141* (2013.01); *H04W 88/08* (2013.01)

(58) Field of Classification Search
CPC ....... H04L 47/125; H04L 47/12; H04L 47/24; H04L 45/38; H04W 28/0289
See application file for complete search history.

(56) References Cited

U.S. PATENT DOCUMENTS

| | | | | |
|---|---|---|---|---|
| 2005/0105490 A1* | 5/2005 | Lee | .................... | H04L 29/12103 370/331 |
| 2007/0121542 A1* | 5/2007 | Lohr | ................. | H04W 72/1242 370/329 |
| 2007/0248080 A1* | 10/2007 | Nesargi | ................... | H04L 47/10 370/352 |
| 2009/0238207 A1* | 9/2009 | Zhao | ..................... | H04W 28/22 370/468 |
| 2010/0118781 A1* | 5/2010 | Petrovic | .................. | H04L 69/32 370/328 |
| 2014/0148189 A1* | 5/2014 | Tapia | ..................... | H04W 16/14 455/454 |
| 2015/0282152 A1* | 10/2015 | Wang | ..................... | H04L 5/0092 370/329 |
| 2015/0359018 A1* | 12/2015 | Li | ......................... | H04W 76/25 370/329 |
| 2017/0034756 A1* | 2/2017 | Faccin | ................ | H04W 28/065 |
| 2017/0359749 A1* | 12/2017 | Dao | ..................... | H04L 47/2416 |
| 2018/0279336 A1* | 9/2018 | Yang | ..................... | H04W 28/24 |

* cited by examiner

*Primary Examiner* — Atique Ahmed

(57) ABSTRACT

A method, a device, and a non-transitory storage medium are described in which a radio access network enforces uplink and downlink aggregate maximum bit rates for packet data unit sessions, uplink and downlink maximum bit rates for non-guaranteed bit rate flows, and uplink and downlink maximum bit rates for service data flows.

20 Claims, 12 Drawing Sheets

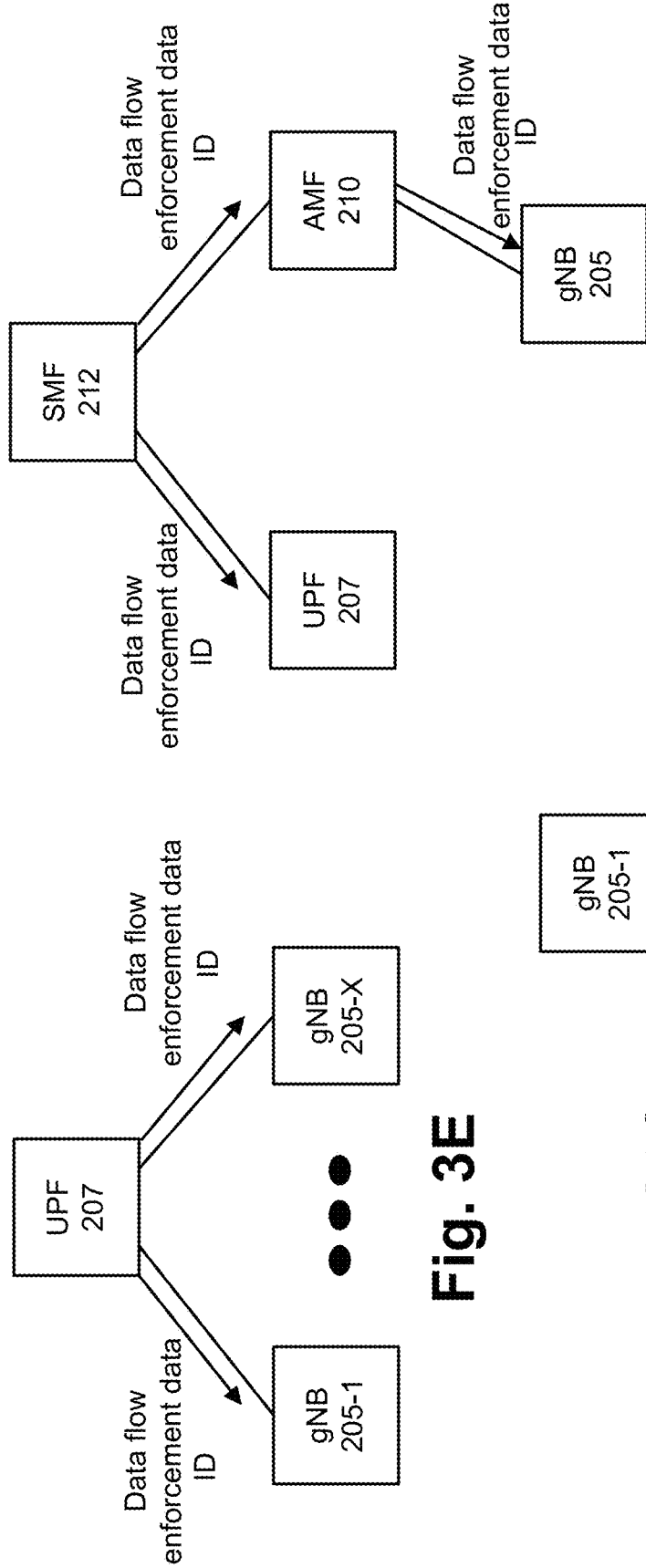

METHOD AND SYSTEM FOR DATA FLOW ENFORCEMENT

BACKGROUND

In a network, traffic or data flows to and from end devices may be governed by various parameters. For example, network devices in the network may manage data flows based on maximum bit rates (MBRs), guaranteed bit rates (GBRs), aggregate maximum bit rates (AMBRs), and so forth.

BRIEF DESCRIPTION OF THE DRAWINGS

FIGS. 3A-3G are diagrams illustrating an exemplary process of the data flow enforcement service;

DETAILED DESCRIPTION OF PREFERRED EMBODIMENTS

Figure 1:
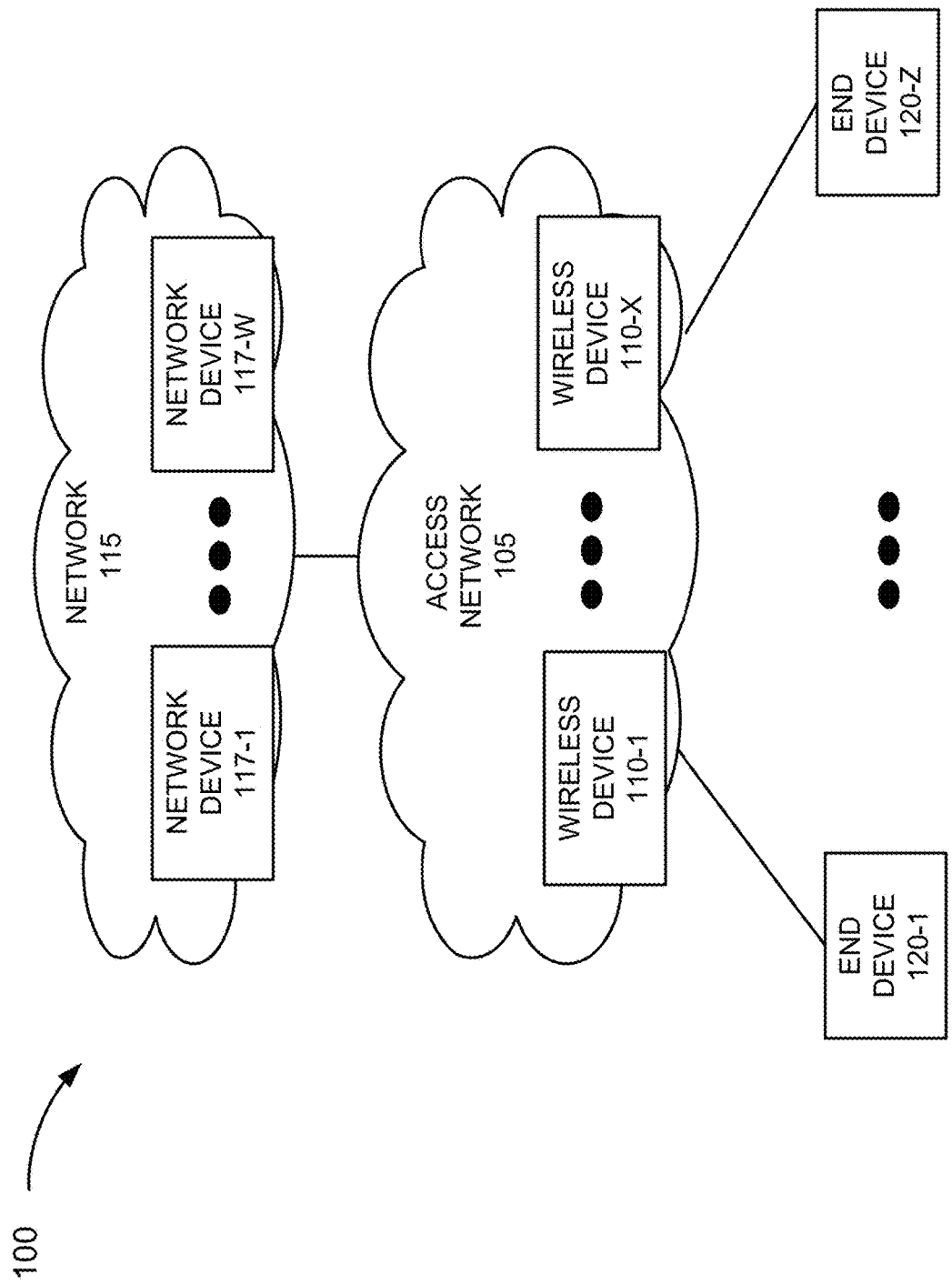
FIG. 1 is a diagram illustrating an exemplary environment in which an exemplary embodiment of a data flow enforcement service may be implemented.

The following detailed description refers to the accompanying drawings. The same reference numbers in different drawings may identify the same or similar elements. Also, the following detailed description does not limit the invention.

Data flow mechanisms may be defined by network administrators or standards governing entities, such as the Third Generation Partnership Project (3GPP) or the International Telecommunication Union (ITU). In a Fourth Generation (4G) network (e.g., a Long Term Evolution (LTE) network) or a 4.5G network (e.g., a LTE-Advanced network), for example, a user equipment (UE) and an evolved Node B (eNB) do not enforce an MBR for a service data flow (SDF). As a result, the UE and the eNB may transmit and receive data at a bit rate greater than the MBR. Consequently, radio network resources are wasted based on the excessive bit rate. According to another example, the eNB does not enforce an access point name AMBR (APN AMBR) for a data flow. As a result, the eNB may transmit and receive data at a bit rate greater than the APN AMBR. Consequently, radio network resources are wasted based on the excessive bit rate. According to yet another example, the eNB does not enforce an MBR for a non-guaranteed bit rate (non-GBR) data flow, which results in radio network resources being wasted.

According to exemplary embodiments, a data flow enforcement service is described. According to an exemplary embodiment, a radio access network (RAN) enforces uplink (UL) and downlink (DL) AMBRs for packet data unit (PDU) sessions, UL and DL MBRs for non-GBR PDU flows, and UL and DL MBRs for service data flows (SDFs). According to an exemplary embodiment, a wireless network device of the RAN receives UL and DL AMBR values for PDU sessions, UL and DL MBR values for non-GBR PDU flows, and UL and DL MBR values for SDFs (also referred to as data flow enforcement data) via control plane messaging or control plane messaging and data plane messaging. According to an exemplary implementation, the messaging may be an operation performed during a PDU session establishment procedure. According to another exemplary implementation, the messaging may be an operation performed during a quality of service (QoS) update procedure. According to yet other exemplary implementations, the messaging may be an operation performed during other types of procedures (e.g., an end device attachment procedure, a handover procedure, an inter-radio access technology (RAT) procedure, etc.).

According to an exemplary embodiment, the data flow enforcement service may be enforced between the wireless network device of the RAN and a wireless end device (e.g., UE, etc.), between wireless network devices of the RAN, and between the wireless network device of the RAN and a network device of another network (e.g., a network device of a core network, a network device of a backhaul network, a wireless network device of another RAN, etc.).

As a result, the data flow enforcement service may save radio network resources in the RAN. The data flow enforcement service may also save network resources for border network devices of other networks that communicate with the RAN.

FIG. 1 is a diagram illustrating an exemplary environment 100 in which an exemplary embodiment of a data flow enforcement service may be implemented. As illustrated, environment 100 includes an access network 105 and a network 115. Access network 105 includes wireless devices 110-1 through 110-X (also referred to collectively as wireless devices 110 and, individually or generally as wireless device 110). Network 115 includes network devices 117-1 through 117-W (also referred to collectively as network devices 117 and, individually, or generally as network device 117). Environment 100 also includes end devices 120-1 through 120-Z (also referred to collectively as end devices 120 and, individually or generally as end device 120). According to other embodiments, environment 100 may include additional networks and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device). The number and the type of devices illustrated in environment 100 are exemplary.

Access network 105 includes one or multiple networks of one or multiple types. For example, access network 105 may be implemented to include a terrestrial network, a wireless network and, a wired network and/or an optical network. According to an exemplary implementation, access network 105 includes a radio access network (RAN). For example, the RAN may be implemented as a Third Generation (3G) RAN, a 3.5G RAN, a 4G RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or an LTE-Advanced (LTE-A) network, a U-TRAN, a 5G-access network (5G-AN or 5G-RAN), a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a Worldwide Interoperability for Microwave Access (WiMAX) network, a local area network (LAN), a personal area network (PAN), or other type of network that provides access to or can be used as an on-ramp to access network 105 and/or network 115.

Depending on the implementation of access network 105, access network 105 may include various types of wireless devices 110. For example, wireless device 110 may be implemented as an evolved Node B (eNB), a remote radio head (RRH), an RRH and a baseband unit (BBU), a BBU, a next generation Node B (gNB), a base station (BS), a base transceiver station (BTS), a radio network controller (RNC), a Node B, or other type of wireless node that provides wireless access to access network 105 (e.g., a home eNB, a femto device, a pico device, a repeater, etc.). According to various exemplary embodiments, wireless device 110 may be implemented according to various architectures of wireless service, such as, for example, macrocell, microcell, femtocell, picocell, metrocell, non-cell, or other configuration.

According to an exemplary embodiment, wireless device 110 includes logic that provides a data flow enforcement service, as described herein. For example, wireless device 110 includes logic that enforces uplink UL and DL AMBRs for PDU sessions, UL and DL MBRs for non-GBR PDU QoS flows, and UL and DL MBRs for SDFs. Wireless device 110 includes logic that enforces UL and DL user equipment AMBRs (UE-AMBR). Wireless device 110 includes logic that receives data flow enforcement data (e.g., AMBR values, MBR values, UE-AMBR values) from one or multiple network devices 117 of network 115 and/or one or multiple wireless devices 110 of access network 105. According to an exemplary embodiment, wireless device 110 receives the data flow enforcement data in control plane messaging. In response to receiving the data flow enforcement data, wireless device 110 stores the data flow enforcement data and uses the data to enforce data flows pertaining to end device 120. Wireless device 110 includes a communication interface that supports the communication of the data flow enforcement data between network device 117 and wireless device 110, between wireless devices 110, and between wireless device 110 and end device 120, as well as the data flow enforcement.

Network 115 includes one or multiple networks of one or multiple types. According to an exemplary implementation, network 115 may include a complementary network pertaining to the one or multiple RANs described. For example, network 115 may include a core network, such as the core part of an LTE network or an LTE-Advanced network (e.g., an evolved packet core (EPC) network), a CDMA core network, a GSM core network (e.g., a network switching subsystem (NSS)), a core network of a next generation wireless network (e.g., a 5G core network, etc.), and so forth.

Depending on the implementation of network 115, network 115 may include various types of network devices 117, such as, for example, a gateway device, a support node, a serving node, a mobility management entity (MME), a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network.

According to an exemplary embodiment, one or multiple network devices 117 of network 115 include logic that provides a data flow enforcement service, as described herein. For example, network device 117 includes logic that stores or obtains and stores UL and DL AMBR values for PDU sessions, UL and DL MBR values and GBR values for non-GBR PDU flows, and UL and DL MBR values for SDFs, and MBR values for SDFs. According to an exemplary embodiment, network device 117 transmits the data flow enforcement data to wireless device 110 in a control plane message. Network device 117 includes a communication interface that supports the communication of the data flow enforcement data between network device 117 and wireless device 110, and between network device 117 and another network device 117, as well as the data flow enforcement.

Network 115 may also be implemented to include a service or an application-layer network. For example, network 115 may include the Internet, the World Wide Web, an Internet Protocol Multimedia Subsystem (IMS) network, a Rich Communication Service (RCS) network, a cloud network, a packet-switched network, a private network, a public network, a telecommunication network, an IP network, or some combination thereof.

End device 120 includes a device that has computational and wireless communication capabilities. End device 120 may be implemented as a mobile device, a portable device, or a stationary device. End device 120 may be implemented as a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 120 may be implemented as a smartphone, a personal digital assistant, a tablet, a netbook, a phablet, a wearable device, a set top box, an infotainment system in a vehicle, a smart television, a game system, a music playing system, or some other type of wireless user device. According to various exemplary embodiments, end device 120 may be configured to execute various types of software (e.g., applications, programs, etc.). The number and the types of software may vary from one end device 120 to another end device 120.

According to an exemplary embodiment, end device 120 includes logic that provides a data flow enforcement service, as described herein. For example, end device 120 includes logic that enforces data flow enforcement data values, as described herein. According to an exemplary embodiment, end device 120 receives the data flow enforcement data in control plane messaging. End device 120 includes a communication interface that supports the communication of the data flow enforcement data from wireless device 110, as well as the data flow enforcement.

Figure 2:
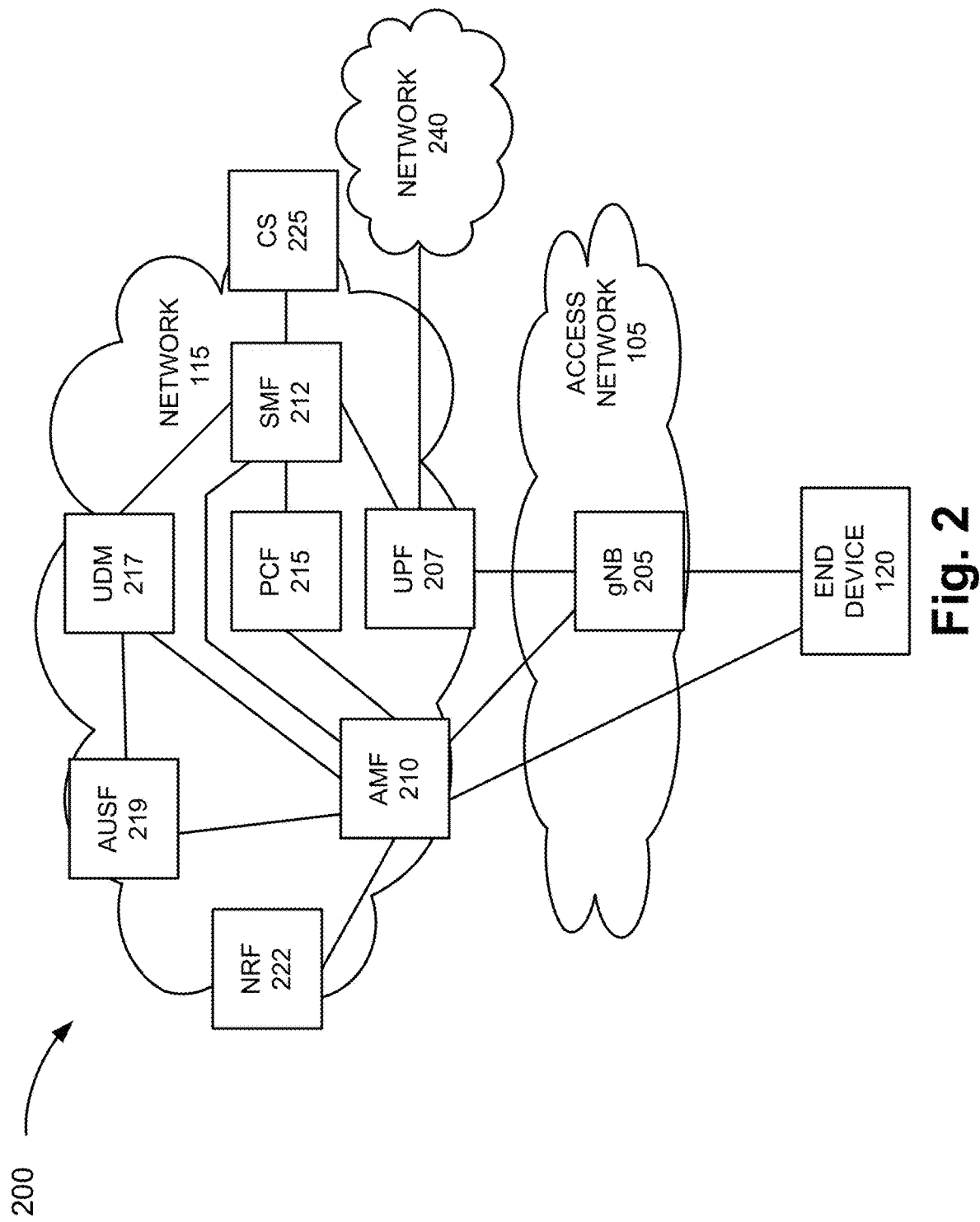
FIG. 2 is a diagram illustrating another exemplary environment in which an exemplary embodiment of the data flow enforcement service may be implemented.

FIG. 2 is a diagram illustrating another environment 200 in which an exemplary embodiment of a data flow enforcement service may be implemented. As illustrated, environment 200 includes access network 105, network 115, end device 120, and a network 240. Access network 105 includes a gNB 205, which may correspond to a wireless device 110. Network 115 includes a user plane function (UPF) 207, an AMF 210, an SMF 212, a PCF 215, a unified data management (UDM) device 217, an authentication server function (AUSF) 219, a network repository function (NRF) 222, and a charging system (CS) 225, which may correspond to network devices 117. Network 240 may be implemented to include one or multiple networks. For example, network 240 may include a service or an application-layer network. According to other embodiments, environment 200 may include additional networks and/or different types of networks than those illustrated and described herein.

Similar to that previously described in relation to environment 100, environment 200 includes communication links between the networks and between the devices. Environment 200 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 2. The number and the arrangement of communication links illustrated in environment 200 are exemplary. Further, a device may be implemented according to various computing architectures and/or network architectures, as previously described. Also, the number and the type of network devices are exemplary.

According to various exemplary embodiments, each of gNB 205, UPF 207, AMF 210, SMF 212, PCF 215, UDM 217, AUSF 219, NRF 222, and CS 225 may operate and provide a function according to a next generation wireless standard (e.g., 3GPP, ITU, etc.) and/or a proprietary technology. According to an exemplary embodiment, gNB 205, AMF 210, SMF 212, and PCF 215 each includes logic that supports the data flow enforcement service. Additionally, according to an exemplary embodiment, gNB 205, AMF 210, SMF 212, and PCF 215 each includes a communication interface that supports the transmission and/or reception of data flow enforcement data that supports the data flow enforcement service, as described herein.

FIGS. 3A-3G are diagrams illustrating an exemplary process of the data flow enforcement service. For example, the process may be included in a PDU session establishment procedure. However, as previously described, according to other examples, the process may be included in other procedures (e.g., an end device attachment procedure, a handover procedure, an inter-RAT procedure, etc.). The messages explained and illustrated are exemplary and may not represent each and every message that may be exchanged. Additionally, depending on the implementation of wireless device 110 and network device 117, the data flow enforcement service may use different messages, which carry data flow enforcement data as described herein, in support of the data flow enforcement service. Also, according to this example, non-access stratum (NAS) is used as the control plane. For example, NAS may be used as the control plane to carry messaging between AMF 210 and end device 120, and SMF 212 and end device 120. However, according to other examples, a future generation control plane or other type of control plane may be used.

Figure 3A:
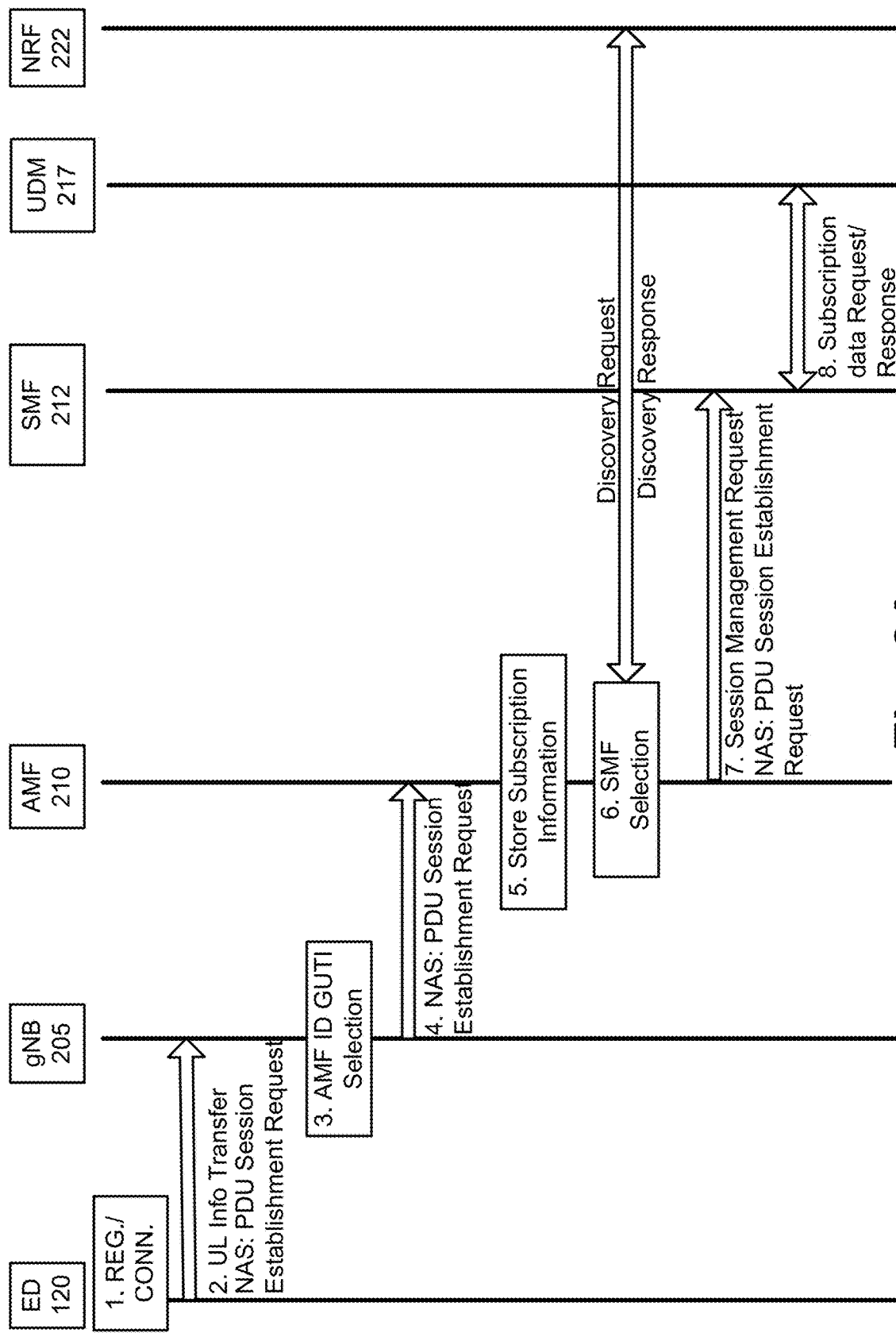

Referring to FIG. 3A, in step (1), end device 120 is registered with network 115 and in a connected mode. In step (2), end device 120 generates and transmits a PDU session establishment request to gNB 205. In step (3), in response to receiving the PDU session establishment request, gNB 205 selects an AMF based on a globally unique temporary identifier (GUTI) (e.g., when available), or based on geo-location. In step (4), in response to the selection, gNB 205 generates and transmits the PDU session establishment request to the selected AMF 210. In step (5), AMF 210 stores subscription information pertaining to end device 120. For example, it may be assumed that AMF 210 obtained the information from a PCF during the registration process of end device 120. The subscription information may include information pertaining to access and mobility restrictions regarding end device 120. In step (6), AMF 210 selects an SMF. For example, the selection process may include AMF 210 transmitting a discovery request to NRF 222, and receiving a discovery response from NRF 222. In step (7), in response to the selection of SMF 212, AMF 210 generates and transmits the PDU session establishment request to the selected SMF 212. In step (8), in response to receiving the PDU session establishment request, SMF 212 obtains subscription data pertaining to end device 120.

Figure 3B:
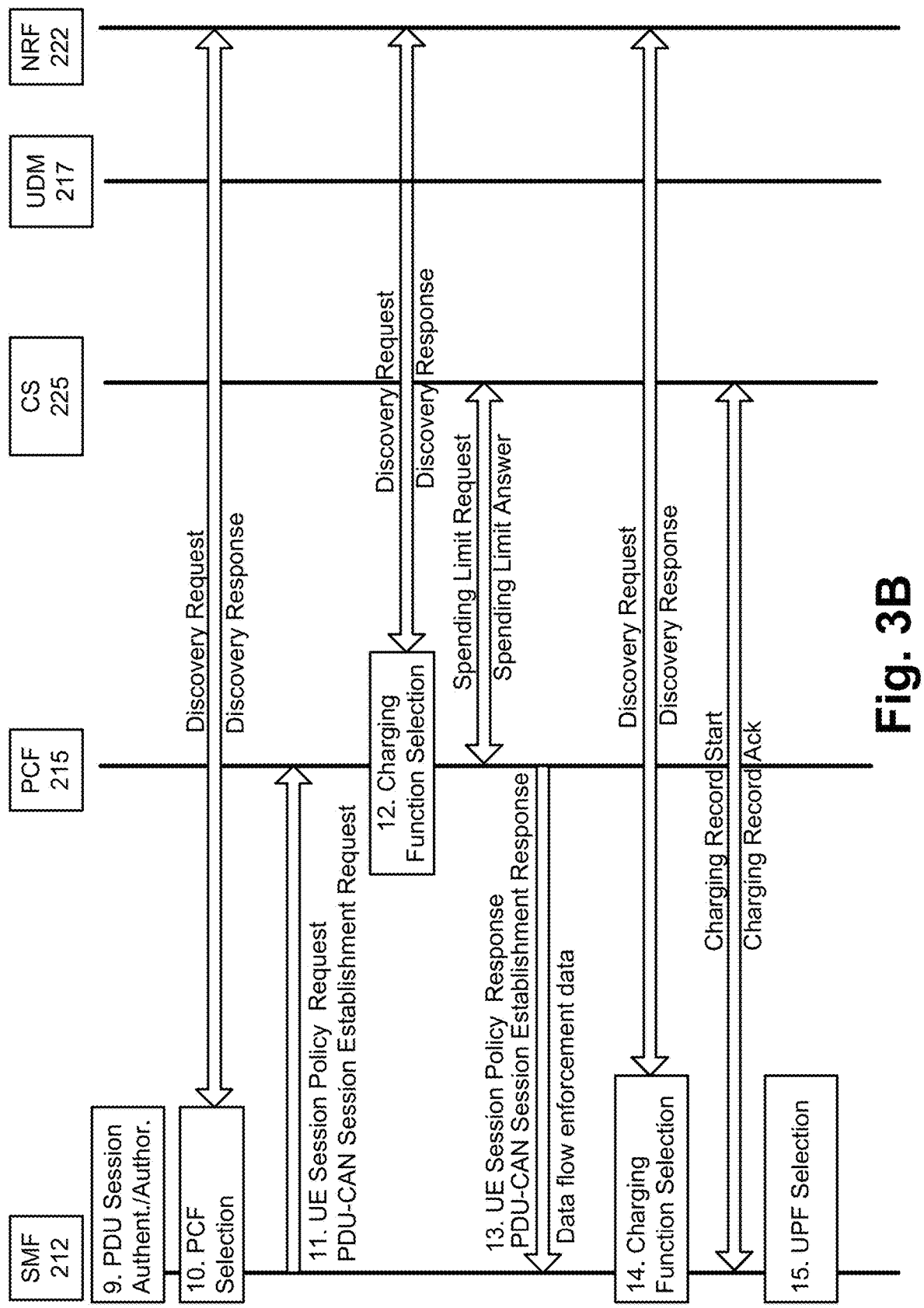

Referring to FIG. 3B, in step (9), in response to receiving the subscription data, SMF 212 performs an authentication and authorization procedure using the subscription data in view of the PDU session establishment request. According to this exemplary scenario, it may be assumed that end device 120 is successfully authenticated and authorized. In step (10), in response to the successful authentication and authorization, SMF 212 selects a PCF. For example, the selection process may include SMF 212 transmitting a discovery request to NRF 222, and receiving a discovery response from NRF 222. In step (11), in response to the selection of PCF 215, SMF 212 generates and transmits a PDU-CAN session establishment request to PCF 215. In step (12), in response to receiving the PDU-CAN session establishment request, PCF 215 selects a CS. For example, the selection process may include PCF 215 transmitting a discovery request to NRF 222, and receiving a discovery response from NRF 222. Additionally, in step (12), in response to the selection of PCF 215, PCF 215 may transmit a spending limit request to the selected CS 225, and may receive a spending limit answer, which pertains to end device 120.

In step (13), PCF 215 generates and transmits a PDU-CAN session establishment response to SMF 212. The PDU-CAN session establishment response may include UL and DL AMBR values for a PDU session pertaining to end device 120. SMF 212 may store the data flow enforcement data. In step (14), SMF 212 performs a charging function selection procedure, which may include transmitting a discovery request to NRF 222, and receiving a discovery response from NRF 222. As illustrated, in response to receiving the discovery response, SMF 212 communicates with the selected CS 225 (e.g., a charging record start, a charging record acknowledgement). In step (15), SMF 212 performs a UPF selection procedure. Although not illustrated, SMF 212 may optionally perform a discovery procedure with NRF 222.

Figure 3C:
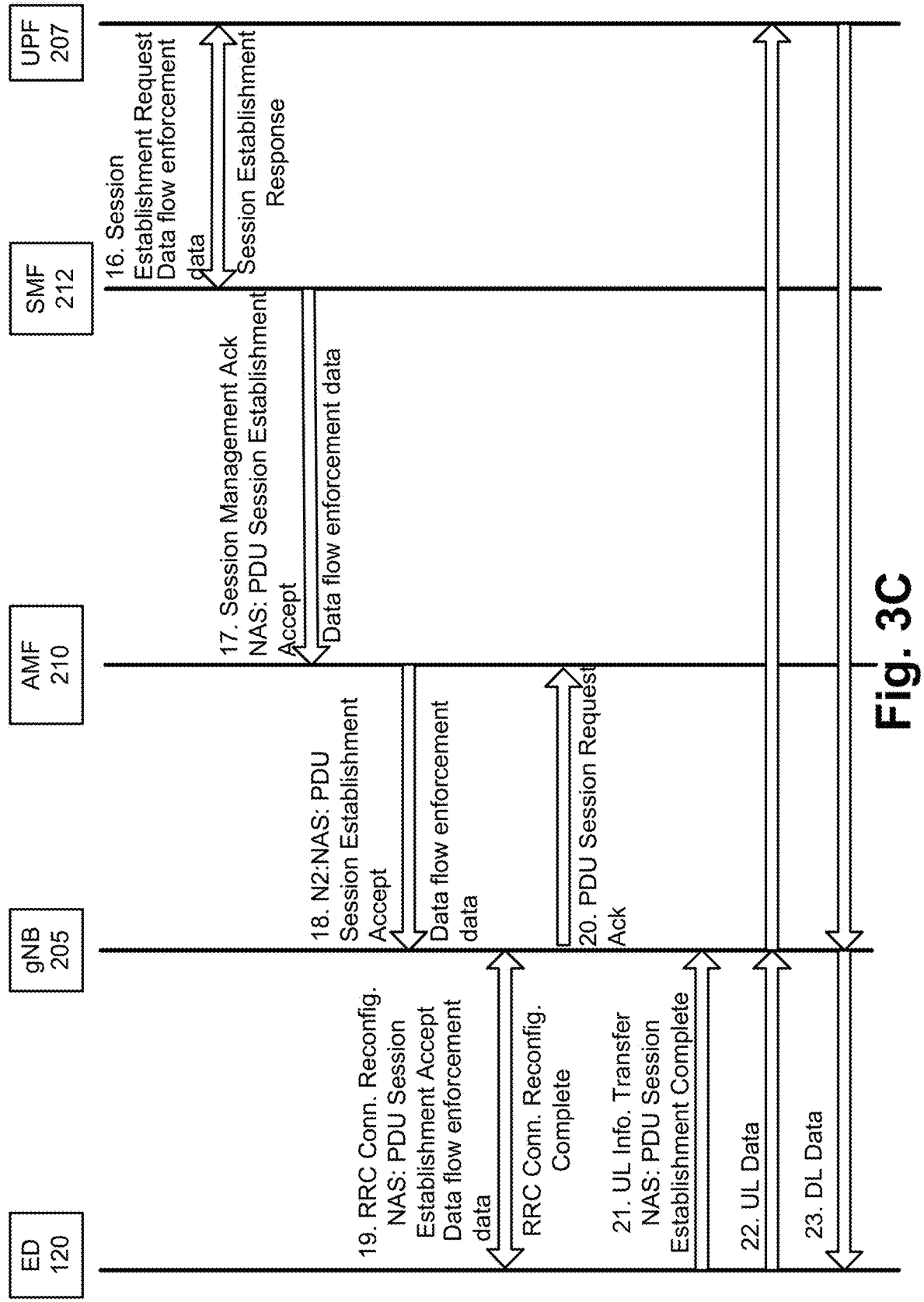
Figure 3D:
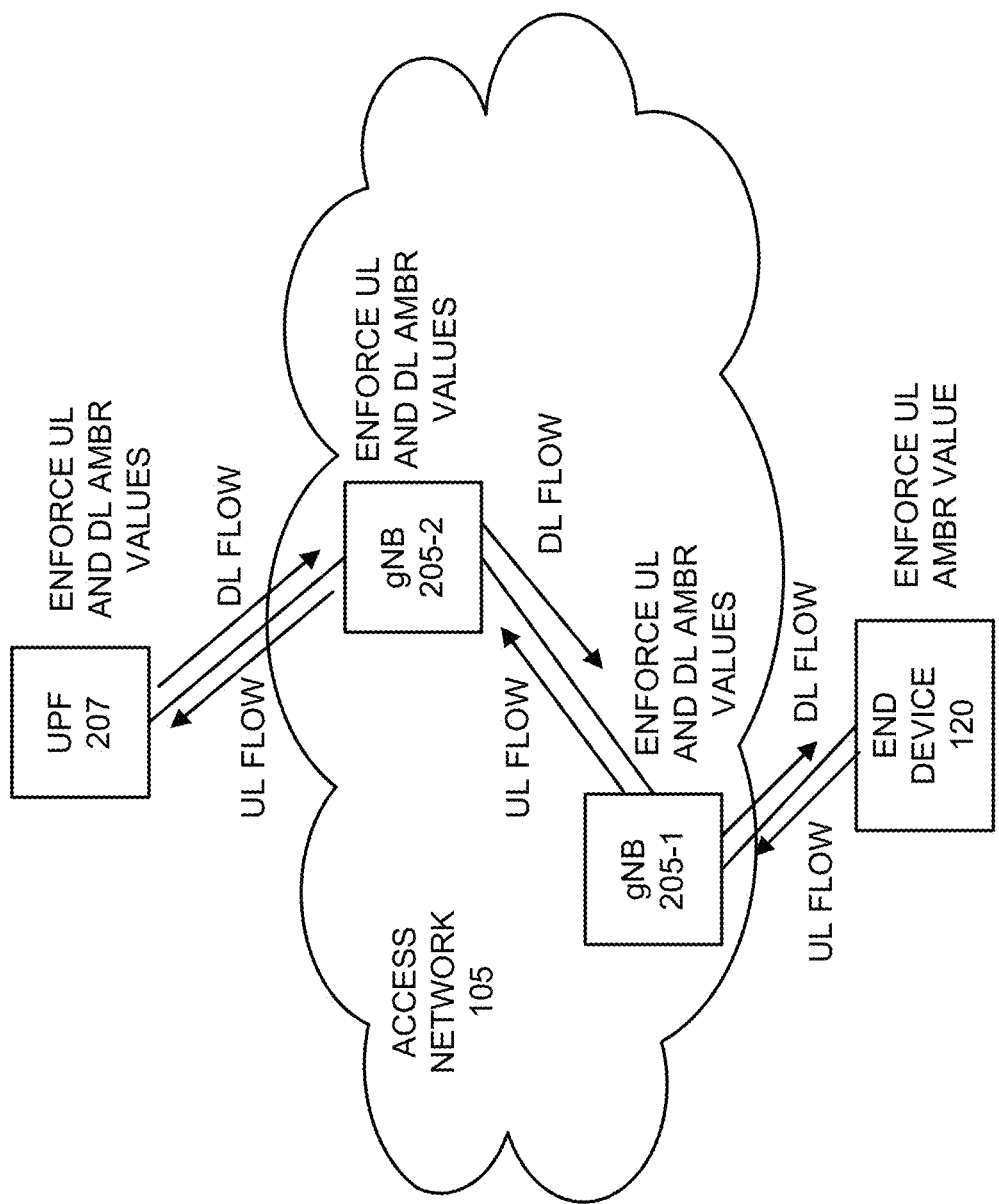

Referring to FIG. 3C, in step (16), SMF 212 may transmit a session establishment request to the selected UPF 207, and may receive a session establishment response from UPF 207. The session establishment request may include the UL and DL AMBR values for the PDU session pertaining to end device 120. UPF 207 may store the data flow enforcement data. The session establishment request may also include flow information to which the data flow enforcement data is to be correlated. In step (17), in response to receiving the session establishment response, SMF 212 may transmit a PDU session establishment accept to AMF 210. The PDU session establishment accept may include the UL and DL AMBR values for the PDU session pertaining to end device 120. AMF 210 may store the data flow enforcement data. In step (18), in response to receiving the PDU session establishment accept, AMF 210 may transmit an N2 message. The N2 message may include a DL NAS transport message or a PDU session establishment accept to gNB 205. The N2 message and also the PDU session establishment accept may each include the UL and DL AMBR values for the PDU session pertaining to end device 120. gNB 205 may store the data flow enforcement data included in the N2 message.

In step (19), gNB 205 may transmit a PDU session establishment accept within a radio resource control (RRC) connection reconfiguration message to end device 120, and end device 120 may transmit an RRC connection reconfiguration complete message to gNB 205. The PDU session establishment accept or the RRC connection reconfiguration message may include the UL AMBR value for the PDU session. End device 120 may store the data flow enforcement data. In step (20), gNB 205 may transmit a PDU session request acknowledgement to AMF 210. In step (21), end device 120 may transmit a PDU session establishment complete to gNB 205.

In step (22), end device 120 may transmit UL data and, in step (23) may receive DL data. For example, network 240 may transmit DL data to end device 120 via network 115 (e.g., UPF 207) and access network 105 (e.g., gNB 205), and end device 120 may transmit UL data to network 240 via access network 105 (e.g., gNB 205) and network 115 (e.g., UPF 207). During the PDU session, gNB 205 uses the UL AMBR value to enforce the UL data received from end device 120, and the DL AMBR value to enforce the DL data transmitted to end device 120. For example, referring to FIG. 3D, according to an exemplary scenario in which the routing of UL and DL flows is static and traverses gNBs 205-1 and 205-2, the data flow enforcement service may include end device 120 enforcing the UL AMBR value, gNBs 205-1 and 205-2 enforcing the UL and DL AMBR values, and UPF 207 enforcing the UL and DL AMBR values pertaining to end device 120. According to other examples, referring to FIGS. 3E-3G, in which the routing of UL and/or DL flows is dynamic and may change over time during the PDU session, the data flow enforcement data may be shared, as illustrated. For example, referring to FIG. 3E, UPF 207 may share the data flow enforcement data in a packet, which carries the UL data or the DL data, to gNB 205. For example, the data flow enforcement data may be included in an extension header, an options field, in a trailer field, and so forth of the UL data or the DL data. Referring to FIG. 3F, SMF 212 may share the data flow enforcement data in the control plane with UPF 207, AMF 210, and gNB 205. Further, referring to FIG. 3G, gNBs 205 may share data flow enforcement data among each other in the control plane. Additionally, for example, the data flow enforcement data may include one or multiple identifiers that may identify a data flow, an end device 120, and/or other context information pertaining to the data flow (e.g., an SDF, etc.).

Although FIGS. 3A-3G illustrate an exemplary process of the data flow enforcement service, according to other exemplary embodiments, additional, fewer, and/or different operations of the data flow enforcement service may be performed. Although not illustrated in FIGS. 3B and 3C, a message that carries data flow enforcement data may include one or multiple identifiers that correlate to the data flow enforcement data and allows for a network device to provide the data flow enforcement service regarding a data flow.

Figure 4:
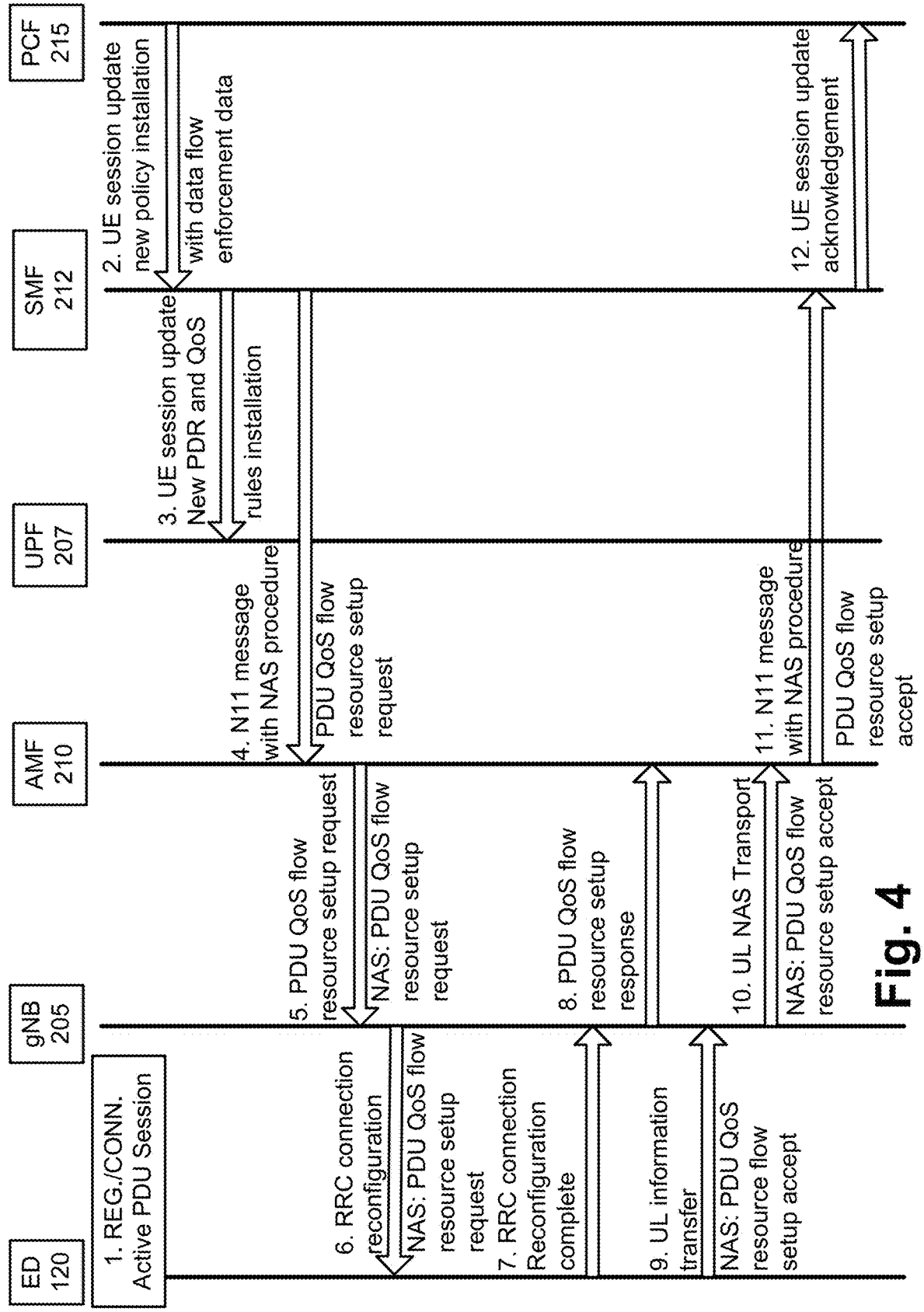
FIG. 4 is a diagram illustrating another exemplary process of the data flow enforcement service.

FIG. 4 is a diagram illustrating another exemplary process of the data flow enforcement service. For example, the process may be included in a non-GBR PDU QoS flow setup procedure. The messages explained and illustrated are exemplary and may not represent each and every message that may be exchanged. Additionally, depending on the implementation of wireless device 110 and network device 117, the data flow enforcement service may use different messages, which carry data flow enforcement data as described herein, in support of the data flow enforcement service.

Referring to FIG. 4, in step (1), end device 120 is registered with network 115, in a connected mode, and has an active PDU session. In step (2), PCF 215 generates and transmits a UE session update indication message that includes a new policy install request and data flow enforcement data to SMF 212. For example, in response to receiving a triggering event (not illustrated), PCF 215 may transmit the UE session update indication message, to SMF 212. As an example, the triggering event may be a flow establishment request from end device 120 via SMF 212. According to another example, the triggering event may be a flow establishment request from an application server to PCF 215. The UE session update indication message may trigger a new non-GBR PDU QoS flow to be setup for end device 120. The data flow enforcement data includes UL and DL MBR values for a non-GBR PDU flow. SMF 212 may store the data flow enforcement data. In step (3), in response to receiving the UE session update indication message, SMF 212 generates and transmits a UE session establishment message to UPF 207. The UE session establishment message may include a new PDR rule and QoS enforcement rule for installation. UPF 207 may store the new PDR and QoS enforcement rules. In step (4), SMF 212 generates and transmits an N11 message, which may include a NAS procedure PDU QoS flow setup request, to AMF 210. The PDU QoS flow resource setup request may include the UL and DL MBR values for the non-GBR PDU flow. AMF 210 may store the UL and DL MBR values for the non-GBR PDU flow. In step (5), in response to receiving the N11 message, AMF 210 generates and transmits a PDU QoS flow resource setup request message, which may include a NAS message. The NAS message may include a PDU QoS flow resource setup request message that carries the UL and DL MBR values for the non-GBR PDU flow.

In step (6), in response to receiving the PDU QoS flow resource setup request message, gNB 205 generates and transmits an RRC connection reconfiguration message that may include a NAS message. The NAS message may include a PDU QoS flow resource setup response that carries the UL and DL MBR values for the non-GBR PDU flow. End device 120 may store the data flow enforcement data. In steps (7)-(12), as illustrated, various complete, response, and accept messages may be generated and transmitted that are responsive to the request messages previously described. gNB 205 may enforce the UL and DL MBR values for the non-GBR PDU flow of end device 120, as well as other network devices, as previously described in relation to FIGS. 3D-3G, and elsewhere in this description.

Although FIG. 4 illustrates an exemplary process of the data flow enforcement service, according to other exemplary embodiments, additional, fewer, and/or different operations of the data flow enforcement service may be performed.

Figure 5:
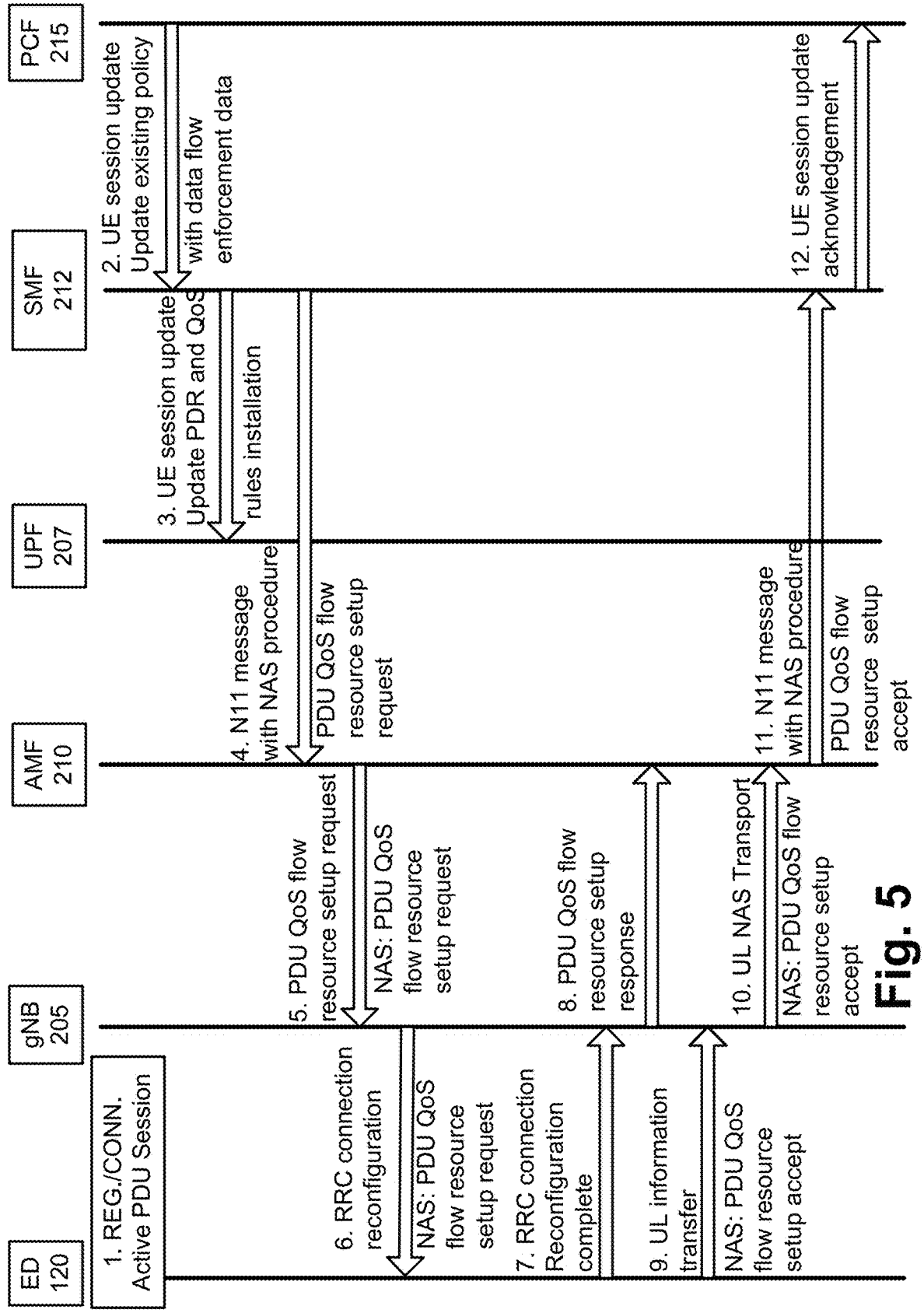
FIG. 5 is a diagram illustrating yet another exemplary process of the data flow enforcement service.

FIG. 5 is a diagram illustrating yet another exemplary process of the data flow enforcement service. For example, the process may be included in an SDF QoS flow setup procedure. The messages explained and illustrated are exemplary and may not represent each and every message that may be exchanged. Additionally, depending on the implementation of wireless device 110 and network device 117, the data flow enforcement service may use different messages, which carry data flow enforcement data as described herein, in support of the data flow enforcement service.

Referring to FIG. 5, in step (1), end device 120 is registered with network 115, in a connected mode, and has an active PDU session. In step (2), PCF 215 generates and transmits a UE session update indication message that includes an update request for an existing policy and data flow enforcement data to SMF 212. For example, in response to receiving a triggering event (not illustrated), PCF 215 may transmit the UE session update indication message, to SMF 212. The update policy request may include UL and DL MBR values for an SDF. The update policy request may also include an SDF template. The SDF template may include a set of SDF filters associated with a policy and charging control rule. SMF 212 may store the data flow enforcement data. In step (3), in response to receiving the UE session update indication message, SMF 212 generates and transmits a UE session establishment message to UPF 207. The UE session establishment message may include a new PDR rule and QoS enforcement rule for installation. UPF 207 may store the new PDR and QoS enforcement rules. In step (4), SMF 212 may generate and transmit an N11 message, which may include a NAS procedure PDU QoS flow update request, to AMF 210. The PDU QoS flow resource update request may include the UL and DL MBR values for the SDF and the SDF template. AMF 210 may store the UL and DL MBR values for the SDF and the SDF template. In step (5), in response to receiving the N11 message, AMF 210 generates and transmits a PDU QoS flow resource update request message, which may include a NAS message. The NAS message may include a PDU QoS flow resource update request message that carries the UL and DL MBR values for the SDF and the SDF template.

In step (6), in response to receiving the PDU QoS flow resource update request message, gNB 205 generates and transmits an RRC connection reconfiguration message that may include a NAS message. The NAS message may include a PDU QoS flow resource udpate response that carries the UL and DL MBR values for the SDF and the SDF template. End device 120 may store the data flow enforcement data. In steps (7)-(12), as illustrated, various complete, response, and accept messages may be generated and transmitted that are responsive to the request messages previously described. gNB 205 may enforce the UL and DL MBR values for the SDF and the SDF template of end device 120, as well as other network devices, as previously described in relation to FIGS. 3D-3G, and elsewhere in this description.

Although FIG. 5 illustrates yet another exemplary process of the data flow enforcement service, according to other exemplary embodiments, additional, fewer, and/or different operations of the data flow enforcement service may be performed.

According to an exemplary embodiment, wireless device 110 and other network devices 117 may store data flow enforcement data and use the data flow enforcement data to provide the data flow enforcement service. Exemplary data flow enforcement data is described further below. According to this example, the data flow enforcement data is structured based on various entities, such as a PDU session, a PDU flow, and an SDF flow. The PDU session may include one or multiple PDU flows, and a PDU flow may include one or multiple SDF flows.

Figure 6:
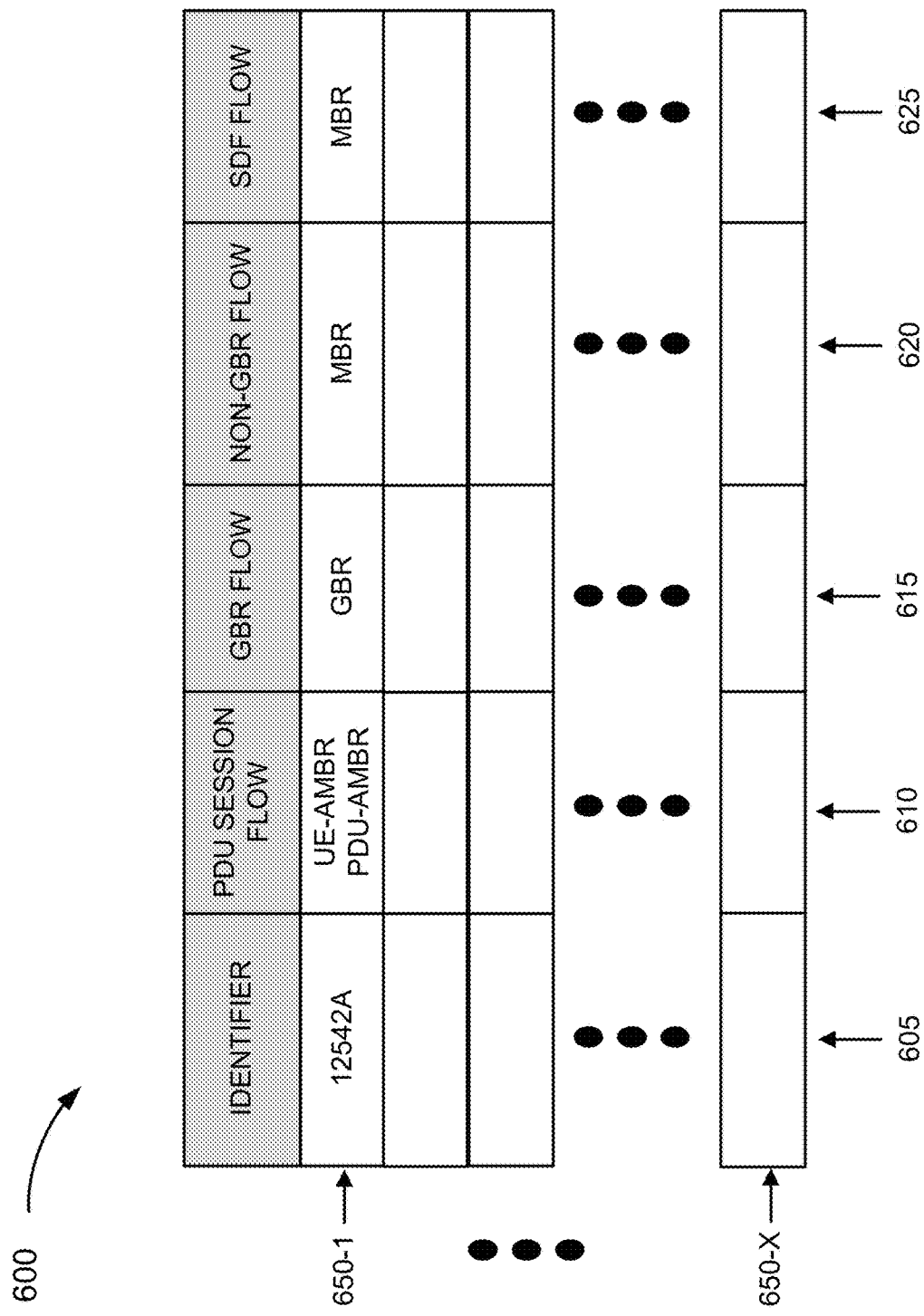
FIG. 6 is a diagram illustrating an exemplary data structure that stores exemplary data flow enforcement data.

Referring to FIG. 6, an exemplary table 600 is illustrated, which stores exemplary data flow enforcement information. As illustrated, table 600 includes an identifier field 605, a PDU session flow field, a GBR flow field 615, a non-GBR flow field 620, and an SDF flow field 625. As further illustrated, table 600 includes records 650-1 through 650-X (also referred to as records 650 and, individually or generally as record 650). Record 650 includes a grouping of fields 605 through 625 that may be correlated. Record 650 may store data flow enforcement data. The data flow enforcement information is illustrated in tabular form merely for the sake of description. The data flow enforcement information may be implemented in a data structure different from a table (e.g., a database, a flat file, a list, etc.).

Identifier field 605 may store one or multiple identifiers pertaining to a data flow and/or a device. For example, identifier field 605 may store an identifier of end device 120, a QoS Flow Identity (QFI), a QoS Class Identifier (QCI), a packet flow identifier, flow information, a PDU session identifier, a Differentiated Services Code Point (DSCP) value, and so forth. According to some exemplary embodiments, network device 117 may add an identifier to a data flow based on the stored data flow enforcement data. For example, UPF 207 or a PGW (not illustrated) may add an identifier to a data flow, which may be used by wireless device 110 to provide the data flow enforcement service. According to other exemplary embodiments, wireless device 110 may add an identifier to a data flow based on the stored data flow enforcement data, which may be used by network device 117 to provide the data flow enforcement service.

PDU session flow field 610 may store data that indicates UL and DL PDU AMBR values pertaining to PDU session flows. GBR flow field 615 may store data that indicates UL and DL GBR values pertaining to GBR PDU flows. Non-GBR flow field 620 may store data that indicates UL and DL MBR values pertaining to non-GBR PDU flows. SDF flow field 625 may store data that indicates UL and DL MBR values pertaining to SDF flows.

According to other exemplary implementations, table 600 may store additional, fewer, and/or different instances of data flow enforcement data in support of the data flow enforcement service, as described herein. For example, PDU session flow field 610 may store data that indicates UL and DL UE AMBR values.

Figure 7:
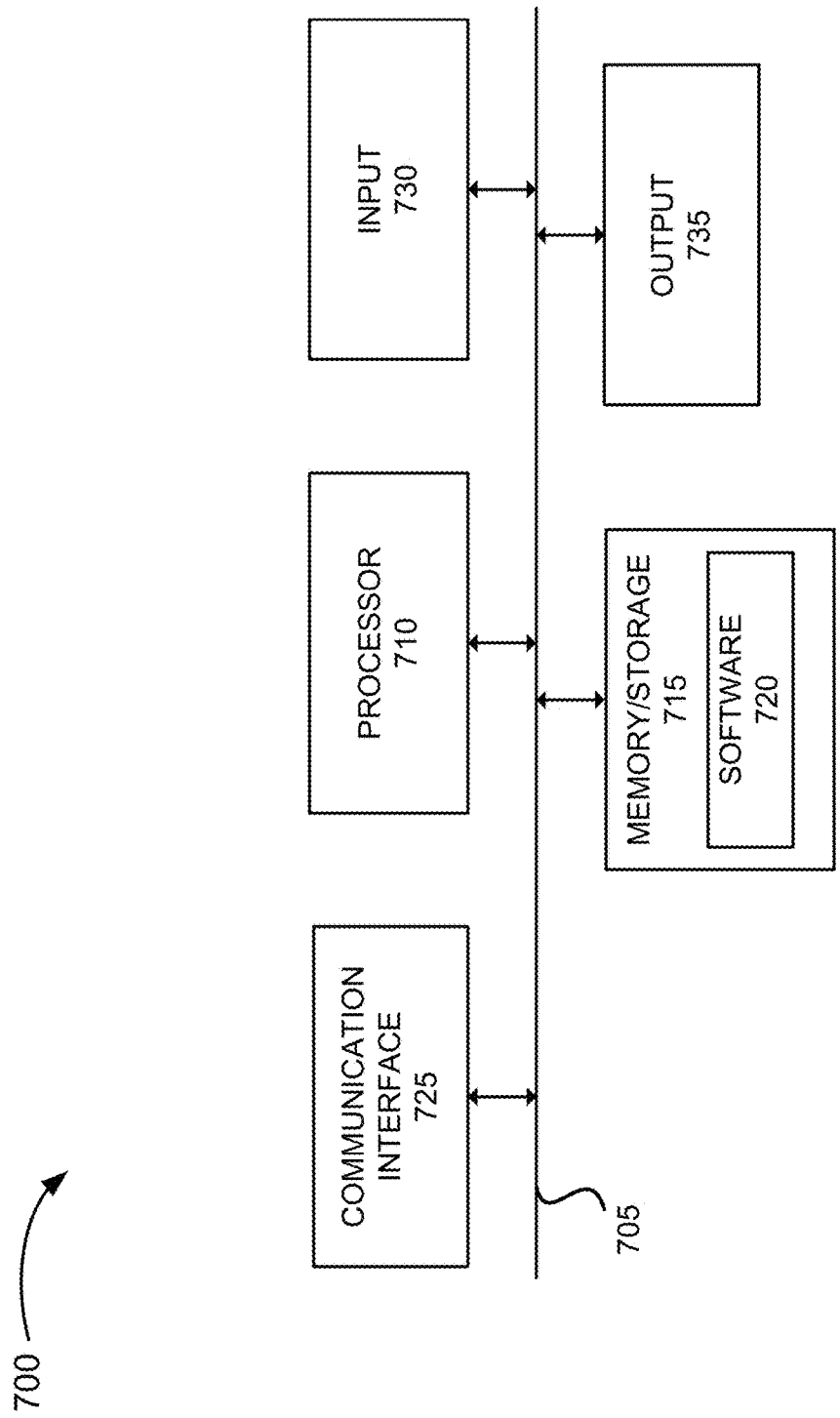
FIG. 7 is a diagram illustrating exemplary components of a device that may correspond to one or more of the devices illustrated herein.

FIG. 7 is a diagram illustrating exemplary components of a device 700 that may correspond to one or more of the devices described herein. For example, device 700 may correspond to components included in wireless device 110, network device 117, and end device 120, and exemplary implementations of the same (e.g., gNB 205, UPF 207, etc.). As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to wireless device 110, software 720 may include an application that, when executed by processor 710, provides the functions of the data flow enforcement service, as described herein. Similarly, network device 117 may include an application that, when executed by processor 710, provides the functions of the data flow enforcement service, as described herein. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
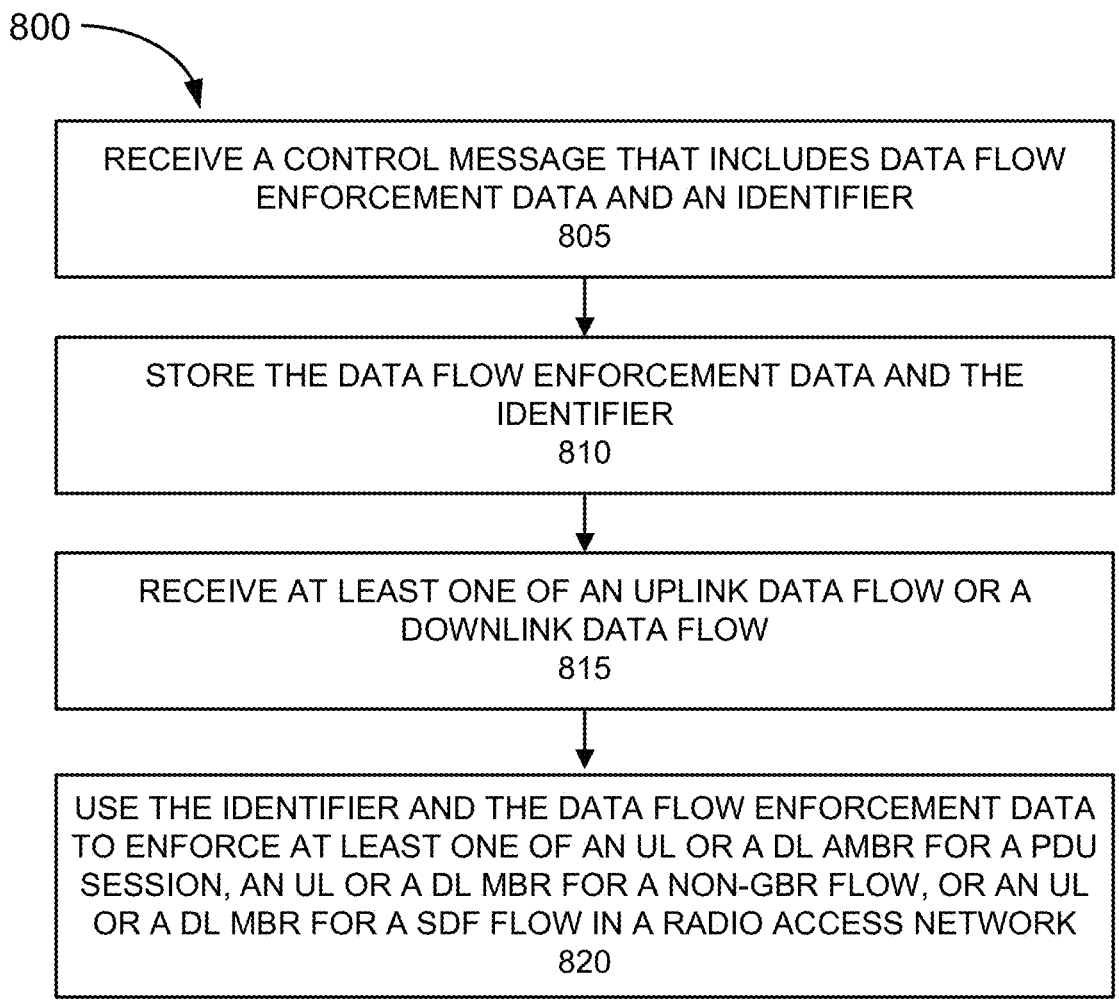
FIG. 8 is a flow diagram illustrating an exemplary process of an exemplary embodiment of the data flow enforcement service.

FIG. 8 is a flow diagram illustrating an exemplary process 800 of an exemplary embodiment of the data flow enforcement service. Process 800 is directed to a process previously described with respect to FIGS. 3A-3E, 4, and 5, as well as elsewhere in this description, in which the data flow enforcement service is provided. According to an exemplary embodiment, wireless device 110 performs steps of process 800. For example, processor 710 executes software 720 to perform the steps illustrated in FIG. 8, and described herein.

Referring to FIG. 8, in block 805, a control message that includes data flow enforcement data and an identifier is received. For example, wireless device 110 receives a control message during a network procedure. For example, the network procedure may relate to a PDU session establishment procedure, an install procedure, an update procedure, or some other type of procedure (e.g., an end device attachment procedure, a handover procedure, etc.) pertaining to end device 120. The control message may be a control plane message of a wireless network (e.g., access network 105).

In block 810, in response to receiving the control message, the data flow enforcement data and the identifier are stored. For example, wireless device 110 stores the data flow enforcement data and the identifier in a data structure or a database (e.g., table 600, etc.).

In block 815, at least one of an uplink data flow or a downlink data flow is received. For example, wireless device 110 may receive an UL data flow. The UL data flow may be received from end device 120 or from another wireless device 110 residing in access network 105. According to another example, wireless device 110 may receive a DL data flow. The DL data flow may be received from another wireless device 110 residing in access network 105, or network device 117 of network 115. The UL data flow may be a data flow that originates from end device 120 or the DL data flow may be a data flow whose destination is end device 120.

In block 820, the identifier and the data flow enforcement data is used to enforce at least one of an UL or a DL AMBR for a PDU session, an UL or a DL MBR for a non-GBR flow, or an UL or a DL MBR for an SDF flow in a radio access network. For example, wireless device 110 may perform a lookup procedure that includes mapping the UL data flow or the DL data flow to the database or the data structure that stores data flow enforcement data. By way of further example, wireless device 110 may compare an identifier of the UL data flow or the DL data flow to an identifier stored in the database or the data structure (e.g., identifier field 605). Wireless device 110 may determine whether a match exists based on a result of the comparison. When a match is found, wireless device 110 may enforce the correlated data flow enforcement data on the UL data flow or the DL data flow. For example, wireless device 110 may enforce, in the radio access network, the UL AMBR value for the PDU session, the DL AMBR value for the PDU session, the UL MBR value for the non-GBR flow, the DL MBR value for the non-GBR flow, the UL MBR value for the SDF flow, and/or the DL MBR value for the SDF flow during the reception and the transmission of the UL data flow or the DL data flow. When a match is not found, wireless device 110 may continue to perform the lookup procedure to select the data flow enforcement data that is to be used for enforcement.

Although FIG. 8 illustrates an exemplary process 800 of the data flow enforcement service, according to other embodiments, process 800 may include additional operations, fewer operations, and/or different operations than those illustrated in FIG. 8, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a computational device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a wireless network device of a radio access network, a first control plane message that includes data flow enforcement data pertaining to an end device, the data flow enforcement data including at least one of a maximum bit rate (MBR) value for a packet data unit (PDU) session or an MBR value for a service data flow (SDF) flow;

storing, by the wireless network device in response to the receiving, the data flow enforcement data;

transmitting, by the wireless network device in response to the storing, a second control plane message that includes the data flow enforcement data to the end device, wherein the end device is in a connected state with a core network;

receiving, by the wireless network device subsequent to the transmitting, at least one of an uplink data flow or a downlink data flow associated with the end device; and enforcing, by the wireless network device and in conjunction with the end device during the receiving of the at least one of the uplink data flow or the downlink data flow, the data flow enforcement data on the at least one of the uplink data flow or the downlink data flow.

2. The method of claim 1, wherein, when receiving the uplink data flow, the method comprises:

receiving, by the wireless network device, the uplink data flow from the end device or a first wireless network device of the radio access network, and wherein, when receiving the downlink data flow, the method further comprises:

receiving, by the wireless network device, the downlink data flow from a second wireless network device of the radio access network, or a network device of the core network.

3. The method of claim 1, further comprising:

transmitting, by the wireless network device and to another device, the at least one of the uplink data flow or the downlink data flow, wherein the at least one of the uplink data flow or the downlink data flow includes the data flow enforcement data; and enforcing, by the wireless network device during the transmitting of the at least one of the uplink data flow or the downlink data flow, the data flow enforcement data on the at least one of the uplink data flow or the downlink data flow.

4. The method of claim 1, wherein the MBR value for the PDU session includes a first uplink MBR value and a first downlink MBR value and wherein the MBR value for the SDF flow includes a third uplink MBR value and a third downlink MBR value.

5. The method of claim 1, further comprising:

storing, by the wireless network device, data flow enforcement data pertaining to multiple end devices, wherein the multiple end devices include the end device, and wherein the data flow enforcement data for each end device includes identifier information that identifies a data flow.

6. The method of claim 5, wherein the enforcing comprises:

identifying, by the wireless network device, an identifier included in the at least one of the uplink data flow or the downlink data flow;

comparing, by the wireless network device in response to the identifying, the identifier to the stored identifier information;

determining, by the wireless network device in response to the comparing, whether a match exists; and selecting, by the wireless network device, the data flow enforcement data of the end device in response to determining that the match exists.

7. The method of claim 1, wherein the wireless network device is one of a base station, an evolved node B (eNB), or a next generation node B (gNB), and wherein the second control plane message includes a radio resource control (RRC) connection reconfiguration message.

8. The method of claim 1, wherein an execution of a network procedure includes the receipt of the first control plane message by the wireless network device of the radio access network subsequent to an attachment of the end device with the wireless network device, and the network procedure includes one of a PDU session establishment procedure pertaining to the end device, or a quality of service (QoS) update procedure pertaining to the end device.

9. A network device comprising:

a communication interface;

a memory, wherein the memory stores instructions; and a processor, wherein the processor executes the instructions to:

receive, via the communication interface, a first control plane message that includes data flow enforcement data pertaining to an end device, the data flow enforcement data including at least one of a maximum bit rate (MBR) value for a packet data unit (PDU) session or an MBR value for a service data flow (SDF) flow;

store, in response to the receipt of the first control plane message, the data flow enforcement data;

transmit, via the communication interface in response to the storage, a second control plane message that includes the data flow enforcement data to the end device, wherein the end device is in a connected state with a core network;

receive, via the communication interface subsequent to the transmission, at least one of an uplink data flow or a downlink data flow associated with the end device; and enforce, in conjunction with the end device and in response to the receipt of the at least one of the uplink data flow or the downlink data flow, the data flow enforcement data on the at least one of the uplink data flow or the downlink data flow, in a radio access network to which the network device belongs.

10. The network device of claim 9, wherein, when receiving the uplink data flow, the processor further executes the instructions to:

receive, via the communication interface, the uplink data flow from the end device or a first network device of the radio access network, and wherein, when receiving the downlink data flow, the processor further executes the instructions to:

receive, via the communication interface, the downlink data flow from the first network device of the radio access network or a network device of the core network.

11. The network device of claim 9, wherein the processor further executes the instructions to:

transmit, via the communication interface to another device, the at least one of the uplink data flow or the downlink data flow, wherein the at least one of the uplink data flow or the downlink data flow includes the data flow enforcement data; and enforce, during the transmission of the at least one of the uplink data flow or the downlink data flow, the data flow enforcement data on the at least one of the uplink data flow or the downlink data flow.

12. The network device of claim 9, wherein the MBR value for the PDU session includes a first uplink MBR value and a first downlink MBR value, and wherein the MBR value for the SDF flow includes a third uplink MBR value and a third downlink MBR value.

13. The network device of claim 9, wherein the processor further executes the instructions to:
   store data flow enforcement data pertaining to multiple end devices, wherein the multiple end devices include the end device, and wherein the data flow enforcement data for each end device includes identifier information that identifies a data flow.

14. The network device of claim 13, wherein, when enforcing, the processor further executes the instructions to:
   identify an identifier included in the at least one of the uplink data flow or the downlink data flow;
   compare, in response to the identification, the identifier to the stored identifier information;
   determine, in response to the comparison, whether a match exists; and
   select the data flow enforcement data of the end device in response to a determination that the match exists.

15. The network device of claim 9, wherein an execution of a network procedure includes the receipt of the first control plane message by the network device of the radio access network subsequent to an attachment of the end device with the network device, and the network procedure includes one of a PDU session establishment procedure pertaining to the end device, or a quality of service (QoS) update procedure pertaining to the end device.

16. A non-transitory, computer-readable storage medium storing instructions executable by a processor of a computational device, which when executed cause the computational device to:
   receive a first control plane message that includes data flow enforcement data pertaining to an end device, the data flow enforcement data including at least one of a maximum bit rate (MBR) value for a packet data unit (PDU) session or an MBR value for a service data flow (SDF) flow;
   store, in response to the receipt of the first control plane message, the data flow enforcement data;
   transmit, in response to the storage, a second control plane message that includes the data flow enforcement data to the end device, wherein the end device is in a connected state with a core network;
   receive, subsequent to the transmission, at least one of an uplink data flow or a downlink data flow associated with the end device; and
   enforce, in conjunction with the end device and during the receipt of the at least one of the uplink data flow or the downlink data flow, the data flow enforcement data on the at least one of the uplink data flow or the downlink data flow, in a radio access network to which the computational device belongs.

17. The non-transitory, computer-readable storage medium of claim 16, further storing instructions executable by the processor of the computational device, which when executed cause the computational device to:
   receive the uplink data flow from the end device or a first computational device of the radio access network; and
   receive the downlink data flow from a second computational device of the radio access network or a network device of the core network.

18. The non-transitory, computer-readable storage medium of claim 16, wherein the instructions further include instructions executable by the processor of the computational device, which when executed cause the computational device to:
   transmit to an other device, the at least one of the uplink data flow or the downlink data flow, wherein the at least one of the uplink data flow or the downlink data flow includes the data flow enforcement data; and
   enforce, during the transmission of the at least one of the uplink data flow or the downlink data flow, the data flow enforcement data on the at least one of the uplink data flow or the downlink data flow.

19. The non-transitory, computer-readable storage medium of claim 16, wherein the instructions further include instructions executable by the processor of the computational device, which when executed cause the computational device to:
   store data flow enforcement data pertaining to multiple end devices, wherein the multiple end devices include the end device, and wherein the data flow enforcement data for each end device includes identifier information that identifies a data flow.

20. The non-transitory, computer-readable storage medium of claim 19, wherein the instructions to enforce further include instructions executable by the processor of the computational device, which when executed cause the computational device to:
   identify an identifier included in the at least one of the uplink data flow or the downlink data flow;
   compare, in response to the identification, the identifier to the stored identifier information;
   determine, in response to the comparison, whether a match exists; and
   select the data flow enforcement data of the end device in response to a determination that the match exists.

* * * * *